United States Patent [19]

Pan

[11] Patent Number: 4,584,503
[45] Date of Patent: Apr. 22, 1986

[54] PHASE CORRECTION ARRANGEMENT FOR DEFLECTION CIRCUIT

[75] Inventor: Harry Pan, Shin Chuang, Taiwan

[73] Assignee: RCA Corporation, Princeton, N.J.

[21] Appl. No.: 573,878

[22] Filed: Jan. 23, 1984

[51] Int. Cl.$^4$ .............................................. H01Q 1/00
[52] U.S. Cl. .................................. 315/370; 315/388; 315/399
[58] Field of Search ............... 315/399, 408, 411, 388, 315/370

[56] References Cited

U.S. PATENT DOCUMENTS

| 4,063,133 | 12/1977 | Nero et al. | 315/370 |
| 4,202,013 | 5/1980 | van Hattum et al. | 358/158 |
| 4,298,829 | 11/1981 | Luz | 315/408 |

FOREIGN PATENT DOCUMENTS 1370074  3/1972  United Kingdom .
1587648  11/1977  United Kingdom .

Primary Examiner—Theodore M. Blum
Attorney, Agent, or Firm—Paul J. Rasmussen; Joseph Laks; Scott J. Stevens

[57] ABSTRACT

A circuit for use in a video display apparatus corrects raster shift due to beam current variations. A horizontal retrace related pulse is applied to the ramp generator for the horizontal deflection phase control circuit, causing the retrace AC zero crossing of the ramp to shift under high beam current conditions. The phase control circuit then shifts the ramp signal to center the synchronizing pulses about the zero crossing, resulting in a raster shift which compensates for the raster shift introduced due to beam current variations.

5 Claims, 4 Drawing Figures

PHASE CORRECTION ARRANGEMENT FOR DEFLECTION CIRCUIT

This invention relates to deflection circuits for television receivers and in particular to circuits that compensate for synchronizing errors caused by circuit loading variations.

The circuits of a television receiver require precisely regulated operating or supply voltages in order to insure reliable operation and to prevent unwanted distortion which would otherwise degrade picture quality. Different operating voltages for individual circuits are ordinarily derived via a transformer from a regulated B+ supply voltage. The regulated B+ voltage may be generated by a switching regulator, incorporating an SCR, which is coupled to a source of unregulated voltage derived from the AC line. Conduction of the SCR charges a supply capacitor which provides the receiver B+ voltage. The conduction time of the SCR is controlled in order to maintain a constant regulated voltage across the supply capacitor. A horizontal deflection rate retrace pulse developed across a primary winding of a high voltage transformer is used to generate the kinescope high voltage or anode potential.

Under heavy circuit loading conditions, for example high picture brightness, the receiver circuits, in particular the high voltage circuit, use more power and the SCR must conduct for a greater period of time. The SCR condition current is also increased, which requires a longer time to turn off the SCR. The SCR is commutated off by a negative-going horizontal retrace pulse; therefore, under heavy loading conditions, the SCR will be conducting for a greater portion of the horizontal retrace interval than under light loading conditions. During conduction, the inductance of the SCR will be shunted across the primary winding of the high voltage transformer. This lowers the overall inductance of the retrace circuit and increases the retrace frequency, thereby modulating the deflection yoke retrace current. This modulation may cause the zero crossover point of the yoke current to change which may cause the video information to be shifted on the kinescope display screen. This may produce asymmetrical changes in raster width in response to picture brightness variations.

In accordance with the present invention, a deflection circuit for a video display apparatus comprises a source of horizontal synchronizing pulses and a circuit for generating horizontal deflection current having a predetermined timing relationship with the synchronizing pulses. The timing relationship is subject to deviation under high circuit loading conditions. Phase control circuitry establishes a predetermined phase relationship between the horizontal synchronizing pulses and horizontal retrace pulses. Horizontal rate correction pulses are provided which have magnitude characteristics determined in response to circuit loading conditions. Means apply the correction pulses to the phase control circuit in order to alter the phase relationship between the synchronizing pulses and the retrace pulses so that the timing relatonship between the synchronizing pulses and the deflection current is corrected.

In the accompanying drawing.

Figure 1:
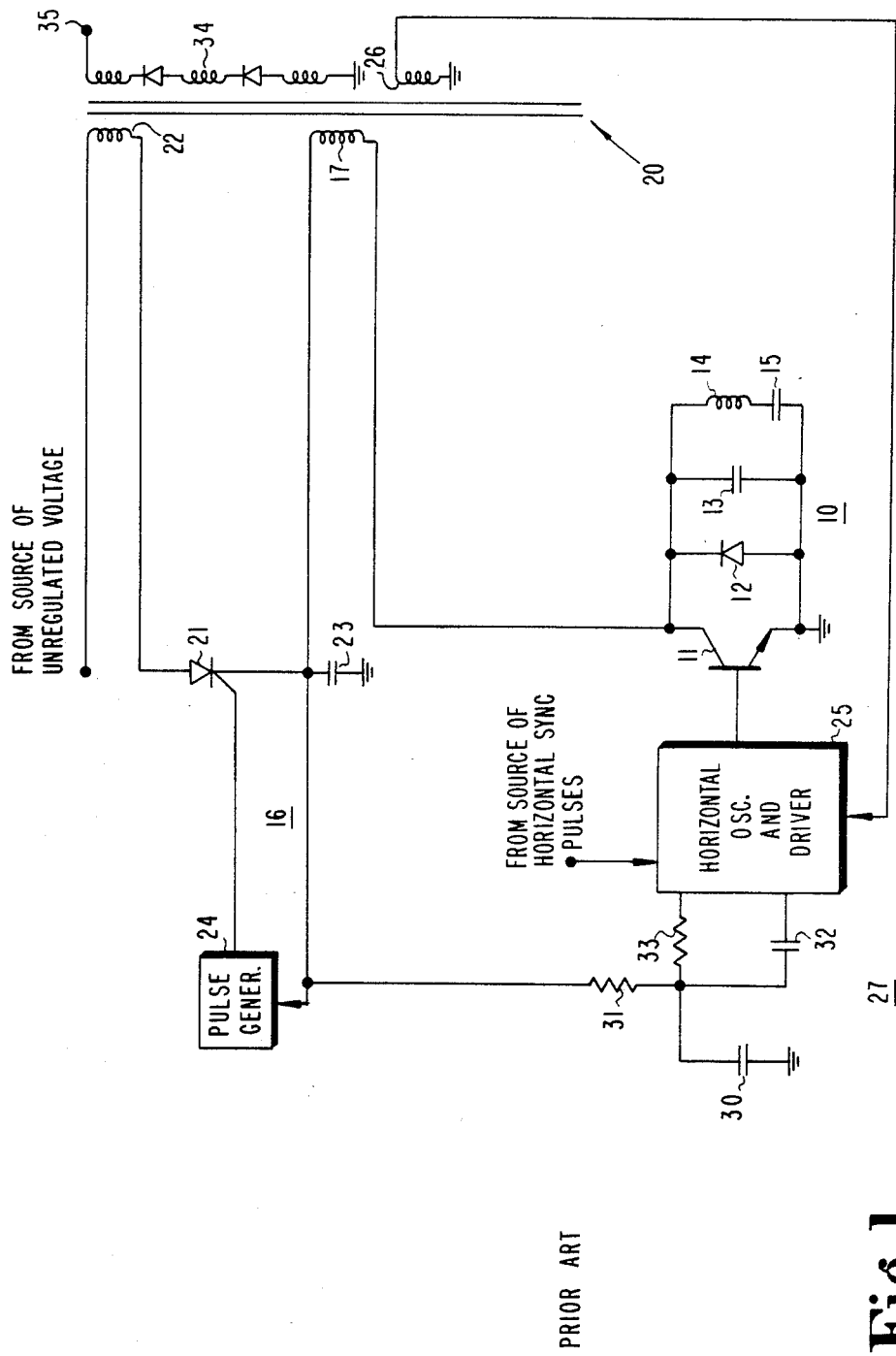
FIG. 1 is a schematic and block diagram of a video display apparatus of the prior art.

FIG. 1 illustrates a portion of a video display apparatus incorporating a horizontal or line deflection circuit. A horizontal output circuit 10 includes a horizontal output transistor 11, a damper diode 12, a retrace capacitor 13, and the series arrangement of a horizontal deflection winding 14 and an S-shaping capacitor 15. Operating power to the horizontal output circuit 10 is provided by a voltage regulator circuit 16 via a primary winding 17 of a power transformer 20. Voltage regulator circuit 16 includes a switching device, illustrated as an SCR 21, which has its anode coupled to a source of unregulated voltage via a winding 22 of transformer 20. The cathode of SCR 21 is coupled to a capacitor 23, which is charged during conduction of SCR 21. The conduction of SCR 21 is controlled so that the voltage across capacitor 23 is maintained at a substantially constant level in order to provide a source of regulated voltage.

SCR 21 is rendered conductive by pulses at its gate terminal provided by a pulse generator circuit 24, which senses the regulated voltage level and increases or decreases the conduction time of SCR 21 each horizontal deflection interval in order to keep the voltage across capacitor 23 constant.

Switching drive pulses for horizontal output transistor 11 are generated by a horizontal oscillator and drive circuit 25, which may comprise an integrated circuit. Horizontal oscillator and driver circuit 25 receives horizontal retrace pulses produced across a winding 26 of transformer 20 and horizontal synchronizing pulses from a source of horizontal synchronizing pulses (not shown). A horizontal rate ramp signal is formed by a ramp circuit 27. During the horizontal trace interval, a capacitor 30 is charged through a resistor 31 to form a ramp which is applied to horizontal oscillator and drive circuit 25 via capacitor 32. The horizontal retrace related pulses are used to reset the ramp via a resistor 33 during the horizontal retrace interval.

Figure 2:
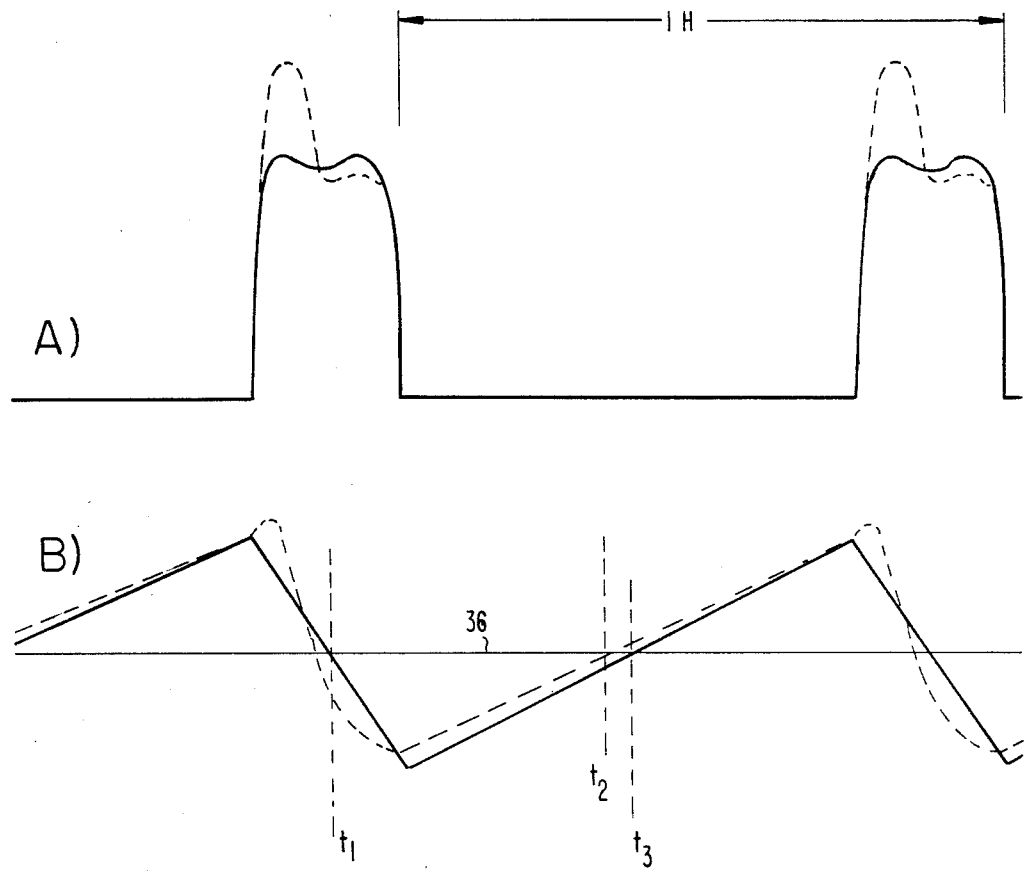
FIG. 2 illustrates waveforms associated with the circuit of FIG. 1.

The switching pulses applied to horizontal output transistor 11 define the horizontal trace and retrace intervals and cause a horizontal deflection current to be generated in horizontal deflection winding 14. During the horizontal retrace interval, transistor 11 is rendered nonconductive, causing a retrace pulse to be formed across winding 17. By transformer action, the voltage of this pulse is stepped up and rectified by high voltage winding 34 to develop a high voltage level at terminal 35 that is applied in the anode terminal of the display apparatus kinescope picture tube (not shown). The power transfer characteristics of transformer 20 are in part determined by the harmonic tuning of the transformer, i.e., the nature of the individual coils and their orientation and position with respect to each other. Under low electron beam current levels, the amount of high voltage energy used by the video display apparatus will be at moderate levels and therefore moderate circuit loading will occur. For a power transformer having third harmonic tuning, for example, the retrace pulse will appear substantially as shown by the solid line in FIG. 2A, and the horizontal deflection current will be as shown by the solid line in FIG. 2B.

With high screen brightness levels, electron beam current will increase and an increase in high voltage power consumption will occur. The harmonic tuning of transformer 20 will cause the horizontal retrace pulse to appear as shown by the dashed line in FIG. 2A. This additional power consumption increases the discharge of the regulated supply capacitor, which will require SCR 21 to be conductive for a greater portion of the horizontal deflection interval to maintain a constant voltage across capacitor 23. The SCR is normally conductive during a portion of the horizontal retrace interval, as the retrace pulse is used to commutate SCR 21 off. During periods of greater conduction, such as previously described, the SCR will conduct for a longer portion of the horizontal retrace interval. During conduction, the inductance of SCR 21 will influence the tuning of the power transformer 20 so that under heavy circuit loading conditions, such as occurs with high beam current, the horizontal retrace resonant frequency is increased, so that the horizontal deflection current is modulated and appears as shown by the dashed line in FIG. 2B.

Horizontal oscillator and driver circuit 25 incorporates a phase detector which adjusts the horizontal oscillator frequency so that the incoming horizontal synchronizing pulses are centered about the AC zero crossing of the retrace portion of the ramp (FIG. 2C) produced by ramp generator 27. The sync pulses FIG. 2D will therefore be centered with the horizontal retrace interval. With the retrace portion of the horizontal deflection current modulated as shown in FIG. 2B, the zero crossing of the trace portion of the deflection current (corresponding to the electron beam reaching the horizontal center of the display screen) will occur at time $t_2$, which is earlier in the horizontal trace interval than its time of occurrence during low beam current conditions, which is time $t_3$. This shift in deflection current zero crossing with respect to the horizontal synchronizing pulses under high beam current conditions causes a shift of video information to the right on the screen with respect to low beam current conditions, assuming the electron beams scan from left to right on the display screen. Additionally, the scanned raster ordinarily expands and contracts due to beam current changes, a condition known as breathing. This previously described shift in deflection current zero crossing causes raster breathing to become asymmetrical.

Figure 3:
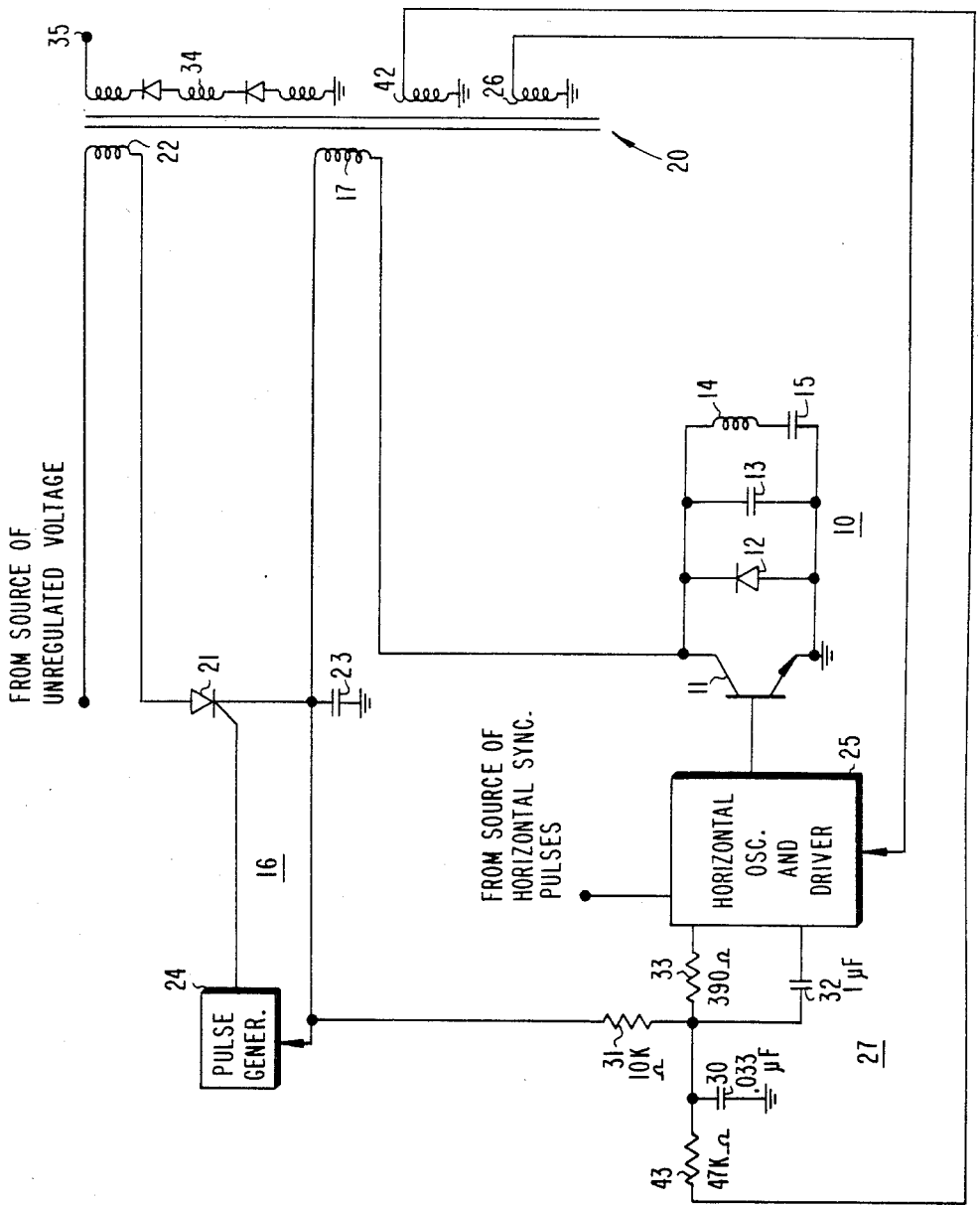
FIG. 3 is a schematic and block diagram of a portion of a video display apparatus, incorporating the deflection circuit of the present invention.
Figure 4:
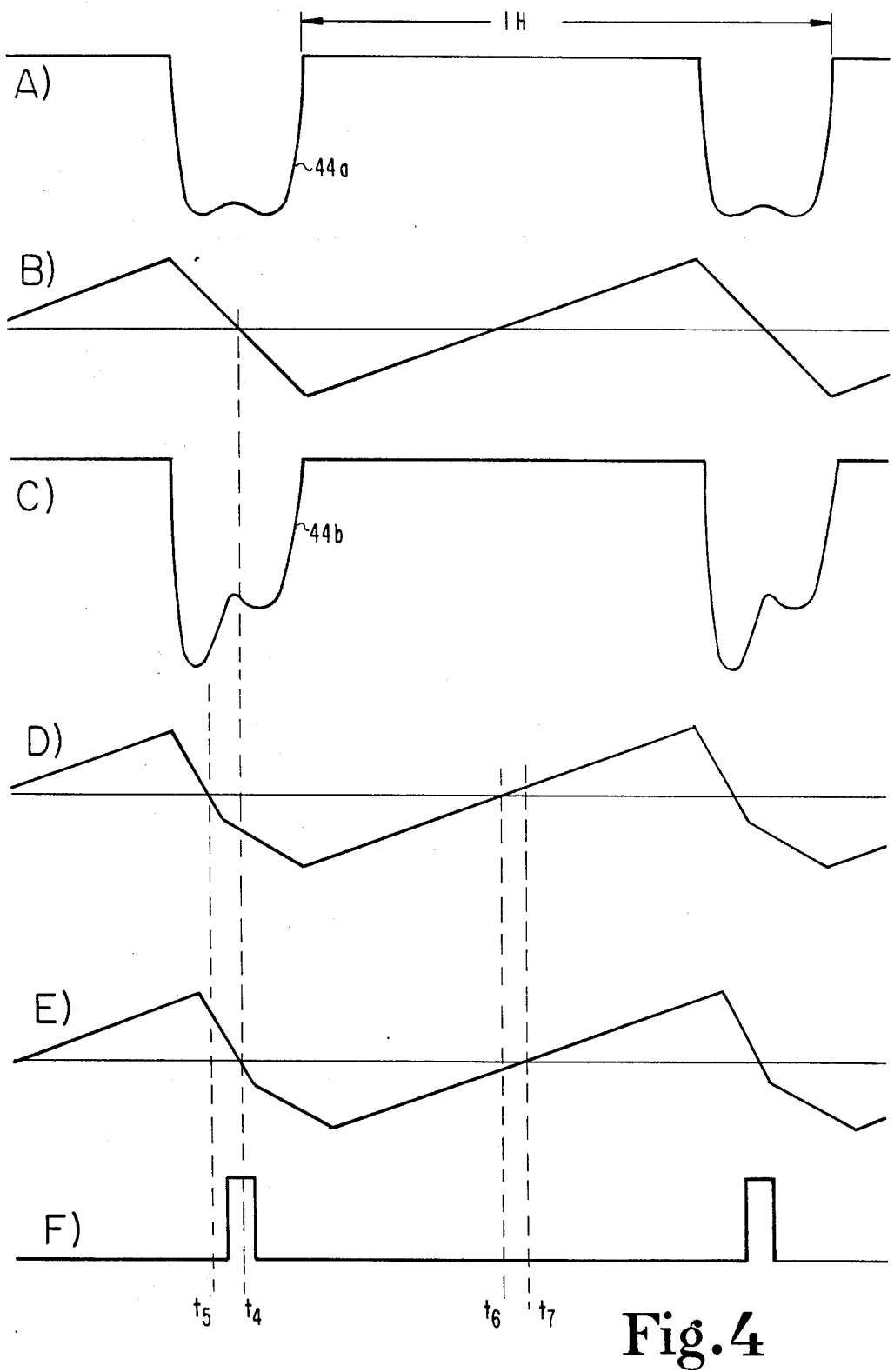
FIG. 4 illustrates waveforms associated with the circuit of FIG. 3.
Figure 1:
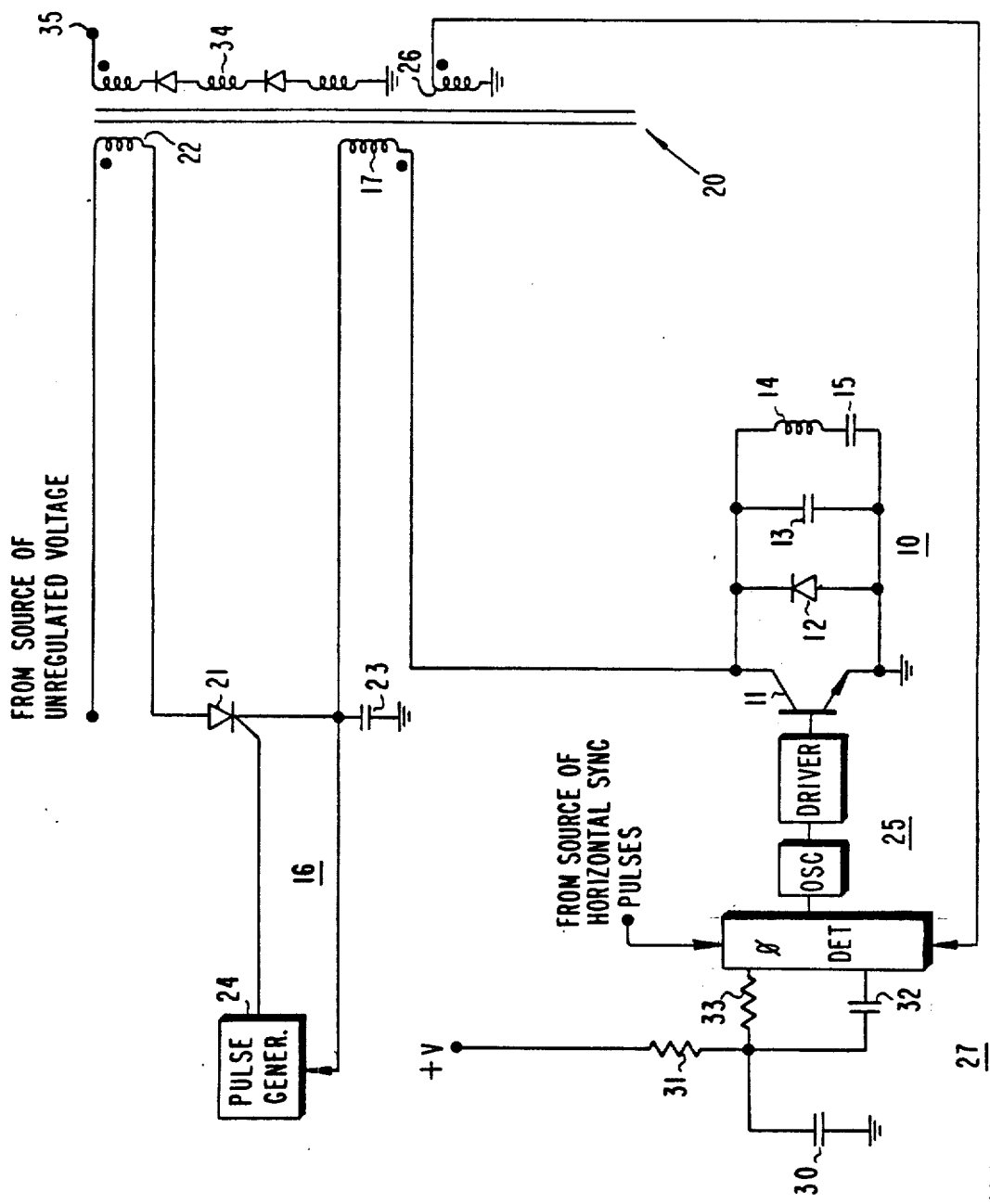
Figure 2:
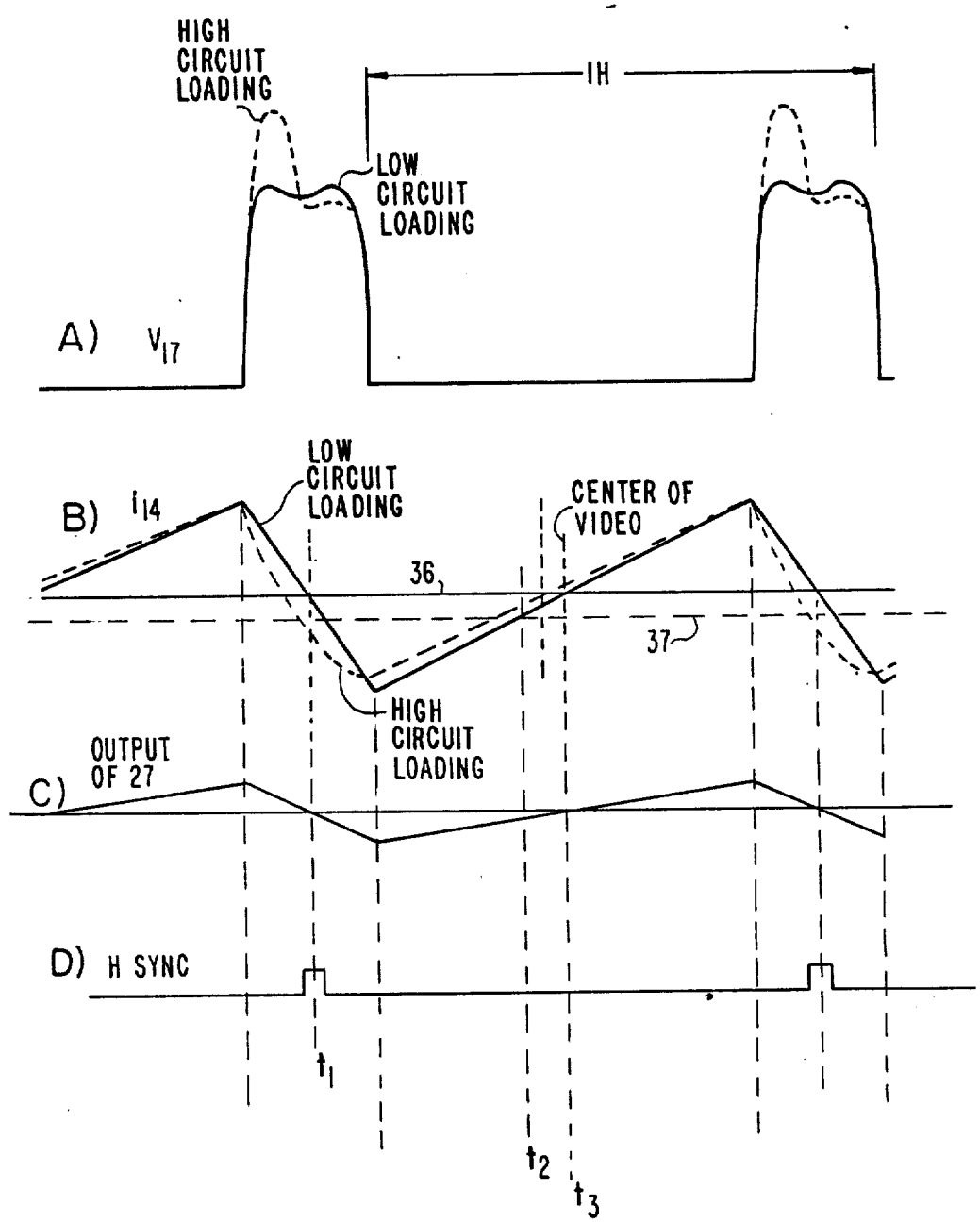
Figure 3:
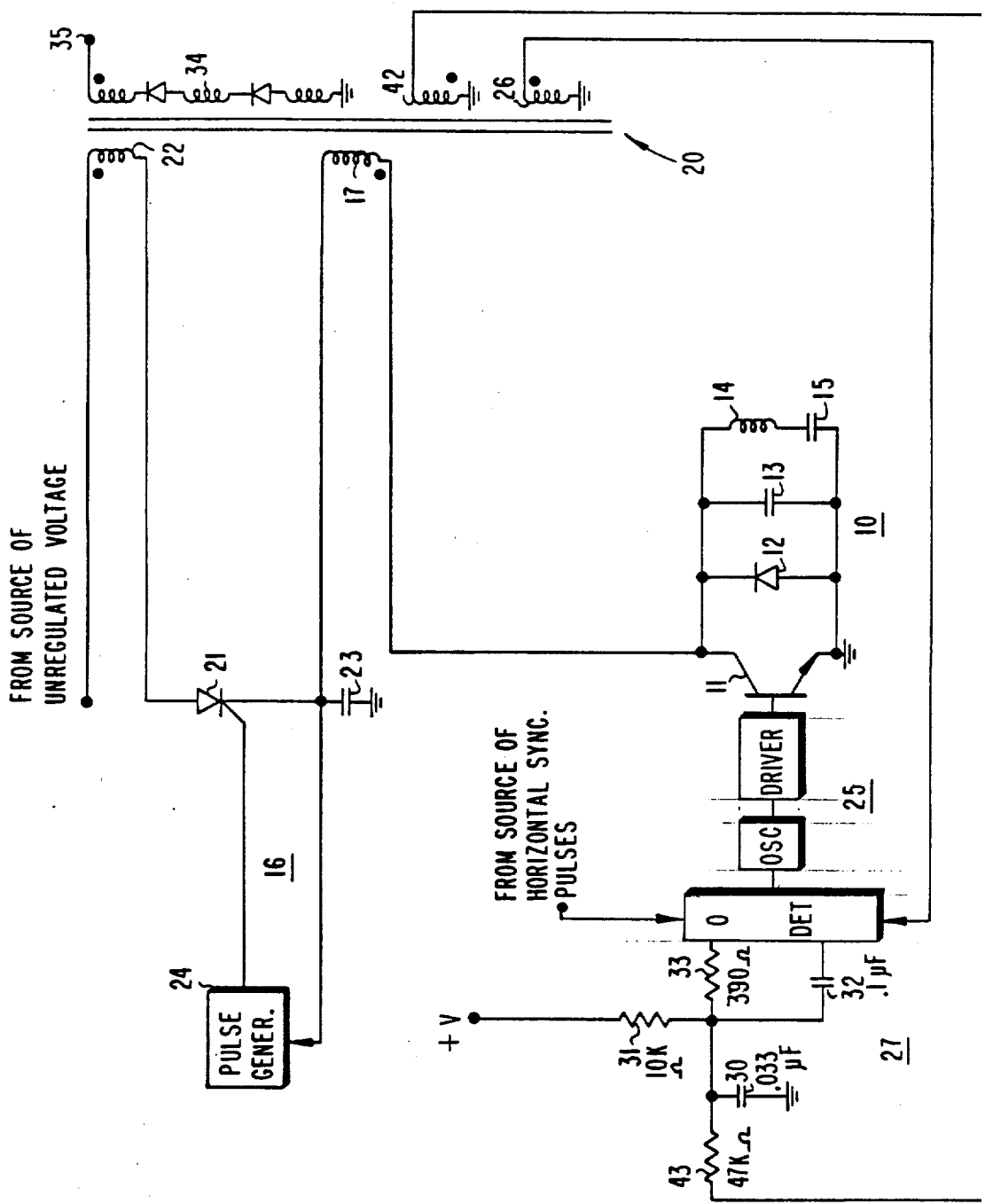
Figure 4:
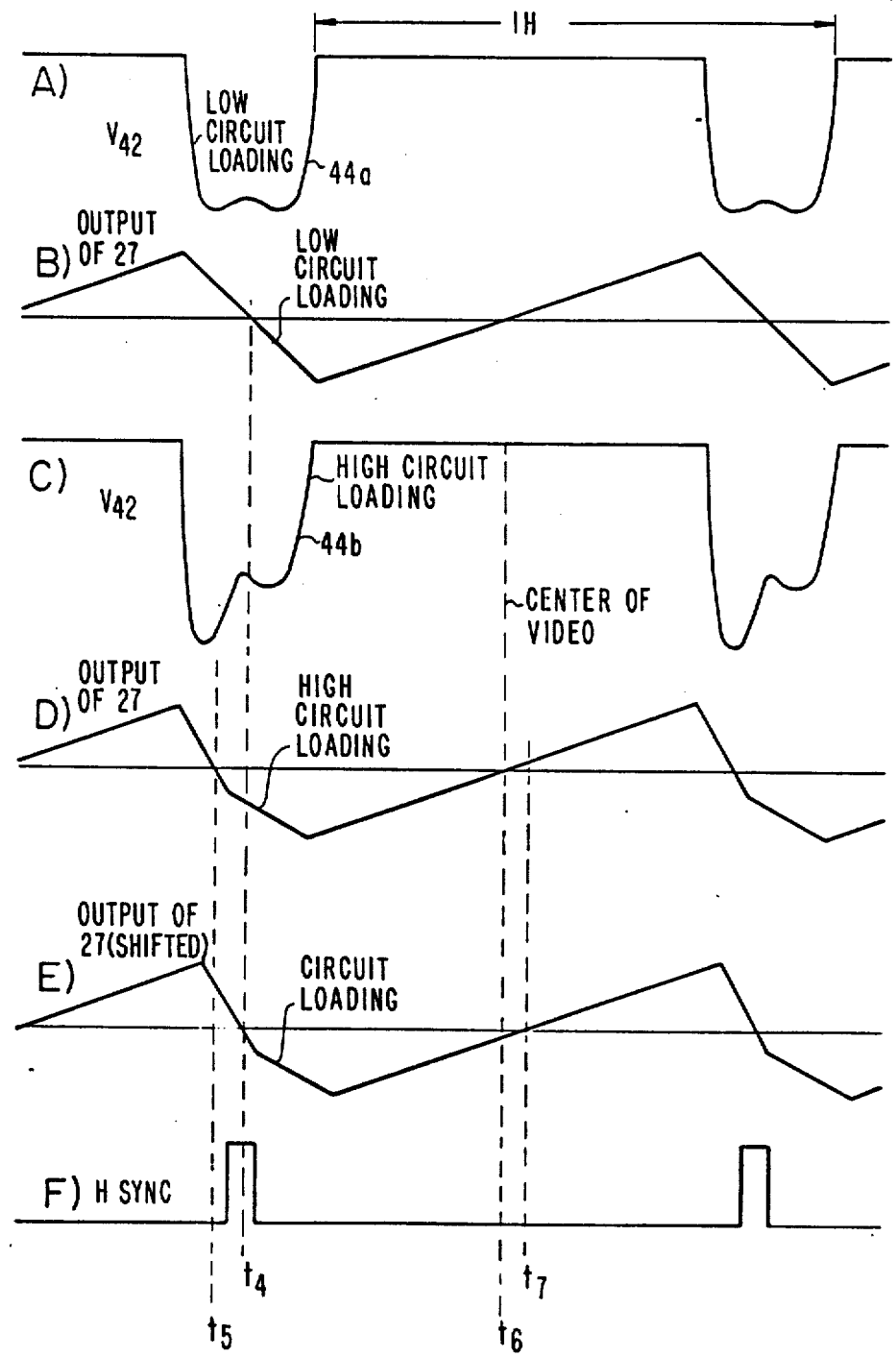

A portion of a video display apparatus that corrects the previously described raster shift due to beam current variations is shown in FIG. 3. A horizontal retrace related pulse developed across a winding 42 of transformer 20 is applied to ramp generator 27 via a resistor 43. This pulse, having a negative-going polarity, is similar in shape to the horizontal retrace pulse across winding 17. That is, this pulse will have a symmetrical shape, as shown by the waveform 44a in FIG. 4A, at low beam current levels and an asymmetrical shape, as shown by waveform 44b in FIG. 4C, at high beam current levels. This is caused by the additional regulator SCR inductance in parallel with winding 17.

At low beam current levels, pulse 44a will have substantially no effect on the ramp signal produced by ramp generator 27, as shown by the ramp waveform in FIG. 4B. AT high beam current levels, however, pulse 44b will cause the ramp signal to be changed to a form similar to that shown in FIG. 4D. It can be seen that the AC zero crossing point of the ramp has been shifted from a time $t_4$ in FIG. 4B to an earlier time $t_5$ in FIG. 4D. Since the incoming synchronizing pulses are centered by the phase control circuit of horizontal oscillator and driver circuit 25 about the AC zero crossing of the retrace portion of the ramp signal, the shift in ramp AC zero crossing time will cause the phase control circuit to shift the ramp signal to the right, as shown in FIG. 4E, so that the synchronizing pulse shown in FIG. 4F, is again centered about the retrace AC zero crossing. The synchronizing pulse will not be centered within the retrace interval as occurs during low beam current conditions.

The shift of the ramp signal also causes the AC zero crossing of the trace interval to be shifted from a time $t_6$ to a later time $t_7$. This shift compensates for the previously described shift in the deflection current zero crossing from time $t_3$ to time $t_2$, as shown in FIG. 2B, in response to increased beam current.

The previously described circuit, therefore, compensates for raster shift at high beam current levels and permits symmetrical raster breathing during beam current changes. Since the retrace related pulse developed across winding 42 is provided each horizontal deflection interval, any raster distortion otherwise introduced by changes in screen brightness will be quickly compensated.

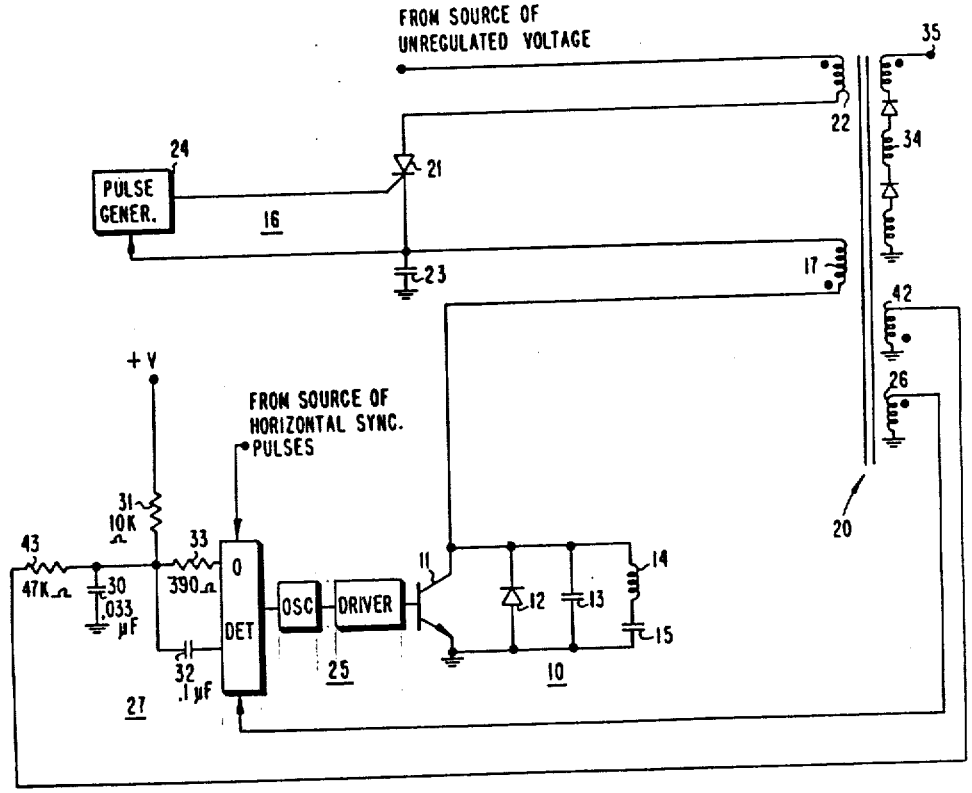

What is claimed is:

1. A deflection circuit for a video display apparatus comprising:
   a source of line rate synchronizing pulses of a video signal;
   deflection means for generating line rate deflection current;
   sawtooth signal generating means for generating a line rate sawtooth signal;
   a phase detector having said sawtooth signal applied to an input thereof for detecting the phase difference between said line rate synchronizing pulses of said video signal and said deflection current and having an output coupled to said deflection means for establishing a predetermined timing relationship between said deflection current and said line rate synchronizing pulses, said deflection circuit subject to distorted operation under high circuit loading conditions such that the timing relationship between said deflection current and said line rate synchronizing pulses is subject to deviation;
   a source of a line rate correction signal having a characteristic indicative of the degree of said distorted operation; and
   means for applying said line rate correction signal to said sawtooth signal generating means for modifying said sawtooth signal to vary in accordance with the degree of said distorted operation in a manner which alters said phase relationship between said line rate synchronizing pulses and said deflection current such that said deviation is corrected.

2. The arrangement defined in claim 1, wherein said sawtooth signal generating means comprises an integrator responsive to said retrace pulses for integrating said retrace pulses to form said sawtooth signal.

3. The arrangement defined in claim 1, wherein said source of line rate correction signal comprises a winding of a transformer.

4. The arrangement defined in claim 3, wherein said transformer is harmonically tuned to the third deflection harmonic.

5. The arrangement defined in claim 1, wherein said line rate correction signal has a substantially symmetrical shape under low circuit loading conditions and an asymmetrical shape under high current loading conditions.

* * * * *

UNITED STATES PATENT AND TRADEMARK OFFICE
CERTIFICATE OF CORRECTION

PATENT NO. : 4,584,503

DATED : April 22, 1986

INVENTOR(S) : Harry Pan

It is certified that error appears in the above-identified patent and that said Letters Patent is hereby corrected as shown below:

Column 1, line 30, that portion reading "condition" should read -- conduction --.

Signed and Sealed this

Twenty-sixth Day of August 1986

[SEAL]

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,584,503

DATED : April 22, 1986

INVENTOR(S) : Harry Pan

It is certified that error appears in the above-identified patent and that said Letters Patent is hereby corrected as shown below:

The title page should appear as shown on the attached sheet.

FIGURES 1, 2, 3 and 4 of the drawing should appear as shown on the attached sheets.

Signed and Sealed this

Thirteenth Day of September, 1988

*Attest:*

DONALD J. QUIGG

*Attesting Officer*         *Commissioner of Patents and Trademarks*

United States Patent [19]

Pan

[11] Patent Number: 4,584,503
[45] Date of Patent: Apr. 22, 1986

[54] PHASE CORRECTION ARRANGEMENT FOR DEFLECTION CIRCUIT

[75] Inventor: Harry Pan, Shin Chuang, Taiwan

[73] Assignee: RCA Corporation, Princeton, N.J.

[21] Appl. No.: 573,878

[22] Filed: Jan. 23, 1984

[51] Int. Cl.⁴ .............................................. H01Q 1/00
[52] U.S. Cl. .................................... 315/370; 315/388; 315/399
[58] Field of Search ............... 315/399, 408, 411, 388, 315/370

[56] References Cited

U.S. PATENT DOCUMENTS 4,063,133  12/1977  Nero et al. ............... 315/370
4,202,013   5/1980  van Hattum et al. ..... 358/158
4,298,829  11/1981  Luz .......................... 315/408

FOREIGN PATENT DOCUMENTS 1370074   3/1972  United Kingdom
1587648  11/1977  United Kingdom Primary Examiner—Theodore M. Blum
Attorney, Agent, or Firm—Paul J. Rasmussen; Joseph Laks; Scott J. Stevens

[57] ABSTRACT

A circuit for use in a video display apparatus corrects raster shift due to beam current variations. A horizontal retrace related pulse is applied to the ramp generator for the horizontal deflection phase control circuit, causing the retrace AC zero crossing of the ramp to shift under high beam current conditions. The phase control circuit then shifts the ramp signal to center the synchronizing pulses about the zero crossing, resulting in a raster shift which compensates for the raster shift introduced due to beam current variations.

5 Claims, 4 Drawing Figures